United States Patent Office 3,146,117
Patented Aug. 25, 1964

3,146,117
GREASE-RESISTANT COATING COMPOSITIONS
Philip E. Shick, Toledo, Ohio, assignor to Owens-Illinois Glass Company, a corporation of Ohio
No Drawing. Filed May 31, 1962, Ser. No. 198,764
12 Claims. (Cl. 106—270)

This invention relates to improved coating compositions, methods of coating paper therewith, and to the coated paper so produced.

In the packaging of nut meats, such as pecans and walnuts, there is need for a paper container which will not only prevent the oil contained in such nuts from penetrating said container but also will retain the nuts in a fresh condition.

Accordingly, it is an object of this invention to provide a novel, economical composition which can be applied readily to box blanks to form boxes which are resistant to the penetration of oil.

A further object of this invention is to provide a method for rendering paper containers resistant to oil penetration.

A further object of this invention is to provide paper containers which are characterized by being resistant to the penetration of oil.

Further objects and advantages of this invention will become apparent from the following description and the appended claims.

The objects of this invention are attained in general by coating a paper product, such as a corrugated scored box blank, with a composition comprising a selected fatty amide, an anti-oxidant and a microcrystalline wax.

The amides which can be employed in the present invention consist of one or more of the following fatty acid amides: linoleamide, oleamide, palmitamide and stearamide. Representative of the amides which can be employed are the Armids. The preferred amides are those Armids consisting of a mixture of three of the aforementioned amides. For example, Armid HT has the following approximate formulations: palmitamide 22%; stearamide 75%; and oleamide 3%. Another useful Armid has the following composition: stearamide 6%; oleamide 91%; and linoleamide 3%. Mixtures consisting of two of the aforementioned amides can also be used.

The preferred anti-oxidant is a highly refined form of 2,6-di-tert-butyl-4-methylphenol or butylated hydroxytoluene (BHT) which is obtainable under the trade name of Ionol. A suitable microcrystalline wax is Shellwax 329. The invention will be better understood by reference to the following examples which are intended to illustrate this invention but not intended to limit the scope thereof, parts and percentages by weight.

EXAMPLE I

| Material: | Percent |
| --- | --- |
| Microcrystalline wax (Shellwax 329) | 95 |
| Fatty acid amide (Armid HT) | 5 |
| Anti-oxidant (Ionol—2,6-di-tert-butyl-4-methyl phenol) | 0.03 |

These coating materials are prepared by first melting the wax and thereafter the fatty amides are stirred into the wax in which it dissolves. The anti-oxidant, if it is to be used, is then added. The anti-oxidant is used for coating packages which are to contain oily but oxygen-sensitive materials such as nut meats. The anti-oxidant can be dispensed with in connection with the packaging of such oily materials as sweeping compounds.

EXAMPLE II

The coating composition as formulated in the same manner as in Example I except the following materials and percentages are used.

| Material: | Percent |
| --- | --- |
| Shellwax 329 | 85 |
| Armid HT | 15 |
| Ionol | 0.03 |

EXAMPLE III

The coating composition as formulated in the same manner as in Example I except the following materials and percentages are used.

| Material: | Percent |
| --- | --- |
| Shellwax 329 | 75 |
| Armid HT | 25 |
| Ionol | 0.03 |

EXAMPLE IV

The coating composition as formulated in the same manner as in Example I except the following materials and percentages are used.

| Material: | Percent |
| --- | --- |
| Shellwax 329 | 95 |
| Armid O | 5 |
| Ionol | 0.03 |

EXAMPLE V

The coating composition as formulated in the same manner as in Example I except the following materials and percentages are used.

| Material: | Percent |
| --- | --- |
| Shellwax 329 | 85 |
| Armid HT | 15 |

In the above examples the composition of Armid HT is:

| | Percent |
| --- | --- |
| Hexadecanamide (palmitamide) | 22 |
| Octadecanamide (stearamide) | 75 |
| 9-octadecanamide (oleamide) | 3 | and of Armid O is:

| | Percent |
| --- | --- |
| Octadecanamide (stearamide) | 6 |
| 9-octadecanamide (oleamide) | 91 |
| 9,12-octadecadieneamide (linoleamide) | 3 |

The effectiveness of the coatings of the present invention in resisting grease and oil penetration is illustrated by the following table wherein a hot melt coating of each of the formulations given was applied to a kraft liner by using a heated bar. Smears of each of the fats and oils enumerated in the table were applied to the flat surface of the kraft paper. Any penetration of the paper surface was considered to be a failure.

Table I
Comparative Evaluation of Hot Melt Coatings

| Formula No. | 1 | 2 | 3 | 4 | 5 | 6 |
|---|---|---|---|---|---|---|
| *Percentage composition* | | | | | | |
| Shellwax 329 | 75 | 100 | | | 50 | 75 |
| Armid HT | 25 | | | 25 | 25 | 5 |
| Paraffin | | | 100 | 75 | | |
| Epolene C [1] | | | | | 25 | 20 |
| *Results after 4–5 hours* | | | | | | |
| Fat or oil: | | | | | | |
| Crisco | ok | F | F | ok | F | F |
| Butter | ok | ? | ? | ok | F | F |
| Oleo | ok | F | F | ok | F | F |
| Cottonseed oil | ok | F | F | ok | F | F |
| Peanut oil | ok | | | | F | F |
| *Results after 16–17 hours* | | | | | | |
| Crisco | ok | | | F | | |
| Butter | ok | | | F | | |
| Oleo | ok | | | F | | |
| Cottonseed oil | ok | | | F | | |
| Peanut oil | ok | | | | | |

[1] Polyethylene.

From the foregoing table, it will be apparent that only Formula 1 proved successful in resisting oil and fat penetration. Formulas 2 and 3 establish that neither microcrystalline nor paraffin wax alone is sufficient. Example 4 proves that paraffin wax cannot be substituted for microcrystalline wax. Formulas 5 and 6 indicate that any substitution of the microcrystalline wax and fatty amide, respectively, by polyethylene leads to unsatisfactory results. In fact all tests made to date have proven that a combination of fatty acid amides and microcrystalline wax must be used. In general, a range of 5 to 25% of fatty acid amides is used with microcrystalline wax with a preferred formulation being 25% of fatty acid amides and 75% of microcrystalline wax. Of course, to this can be added from 0.03% and less to 0.3% of an anti-oxidant, such as Shell Ionol, particularly where one is coating containers which are to be used to preserve oily materials that are oxygen sensitive, such as certain bakery goods and nut meats.

In general, from 6 to 12 pounds of the coating composition of this invention are applied per 1000 square feet of surface area of paper or paperboard.

Various modifications and changes can be made in the invention disclosed herein as will be apparent to those skilled in the art. For example, kraft paper, corrugated board and other types of paper board can be coated with the novel composition of this invention in ordinary waxing machines by passing the paper or paperboard through the wax bath in the usual way.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as patentable equivalents thereof by those skilled in the art to which the invention pertains.

I claim:

1. A coating composition consisting of 5 to 25% of a mixture of fatty acid amides derived from the group consisting of straight chain monobasic saturated fatty acids and straight monobasic unsaturated fatty acids having at least 16 carbon atoms and 95 to 75% of a microcrystalline wax.

2. A coating composition consisting of about 75% microcrystalline wax and about 25% of a fatty acid amide derived from an acid selected from the group consisting of straight chain monobasic saturated fatty acids and straight chain unsaturated fatty acids having at least 16 carbon atoms.

3. A coating composition consisting of about 75% microcrystalline wax and about 25% of a mixture of at least two fatty acid amides derived from acids selected from the group consisting of straight chain monobasic saturated fatty acids and straight chain unsaturated fatty acids having at least 16 carbon atoms.

4. A coating composition consisting of about 75% microcrystalline wax, about 25% of a fatty acid amide derived from an acid selected from the group consisting of straight chain monobasic saturated fatty acids and straight chain monobasic unsaturated fatty acids having at least 16 carbon atoms, and less than 1% of an anti-oxidant.

5. A coating composition consisting of about 75% microcrystalline wax, about 25% of a mixture of at least two fatty acid amides derived from acids selected from the group consisting of straight chain monobasic saturated fatty acids and straight chain monobasic unsaturated fatty acids having at least 16 carbon atoms, and less than 1% of an anti-oxidant.

6. The coating composition of claim 1 in which there is incorporated less than 1% of an anti-oxidant.

7. The composition of claim 6 in which the anti-oxidant is butylated hydroxytoluene.

8. Paper coated with the composition consisting of about 75% microcrystalline wax and about 25% of a fatty acid amide derived from an acid selected from the group consisting of straight chain monobasic saturated fatty acids and a straight chain monobasic unsaturated fatty acid containing at least 16 carbon atoms.

9. Paper coated with a composition consisting of about 75% microcrystalline wax and about 25% of a mixture of fatty acid amides derived from acids selected from the group consisting of straight chain monobasic saturated fatty acids and straight chain monobasic unsaturated fatty acids having at least 16 carbon atoms.

10. The coated paper of claim 11 in which the composition also contains less than 1% of an anti-oxidant.

11. Paper coated with a composition consisting of 75 to 95% microcrystalline wax and 5 to 25% of a fatty acid amide derived from the group consisting of straight chain monobasic saturated fatty acids and straight monobasic unsaturated fatty acids having at least 16 carbon atoms.

12. Paper coated with a composition consisting of 75 to 95% microcrystalline wax and 5 to 25% of a mixture of fatty acid amides derived from the group consisting of straight chain monobasic saturated fatty acids and straight monobasic unsaturated fatty acids having at least 16 carbon atoms.

References Cited in the file of this patent

UNITED STATES PATENTS

| | | |
|---|---|---|
| 2,803,612 | Moyer | Aug. 20, 1957 |
| 2,962,390 | Fain et al. | Nov. 29, 1960 |
| 3,060,045 | Malakoff et al. | Oct. 23, 1962 |
| 3,061,493 | Anderson | Oct. 30, 1962 |